(12) United States Patent
Savolainen

(10) Patent No.: US 11,195,154 B2
(45) Date of Patent: Dec. 7, 2021

(54) METHOD AND APPARATUS FOR AUTOMATIC INTER-DEVICE AUTHORISATION

(71) Applicant: Nokia Technologies Oy, Espoo (FI)

(72) Inventor: Teemu Ilmari Savolainen, Nokia (FI)

(73) Assignee: Nokia Technologies Oy, Espoo (FI)

(*) Notice: Subject to any disclaimer, the term of this patent is extended or adjusted under 35 U.S.C. 154(b) by 890 days.

(21) Appl. No.: 15/128,340

(22) PCT Filed: Mar. 27, 2014

(86) PCT No.: PCT/FI2014/050223
§ 371 (c)(1),
(2) Date: Sep. 22, 2016

(87) PCT Pub. No.: WO2015/144971
PCT Pub. Date: Oct. 1, 2015

(65) Prior Publication Data
US 2017/0124534 A1    May 4, 2017

(51) Int. Cl.
*G06Q 20/06* (2012.01)
*G06Q 20/22* (2012.01)
(Continued)

(52) U.S. Cl.
CPC .......... *G06Q 20/065* (2013.01); *G06Q 20/22* (2013.01); *G06Q 20/36* (2013.01);
(Continued)

(58) Field of Classification Search
CPC ...... G06Q 20/065; G06Q 20/22; G06Q 20/36; G06Q 20/3678; G06Q 20/4016;
(Continued)

(56) References Cited

U.S. PATENT DOCUMENTS

RE40,444 E  *  7/2008  Linehan ................. G06Q 20/02
                                                        705/65
2007/0150385 A1 * 6/2007 Ode ....................... G06Q 20/04
                                                        705/30
(Continued)

FOREIGN PATENT DOCUMENTS

CN         101017581 A      8/2007
CN         101627395 A      1/2010
(Continued)

OTHER PUBLICATIONS

Wikipedia: Bitcoin Network (version archived Mar. 3, 2014 (Year: 2014).*
(Continued)

*Primary Examiner* — Patrick McAtee
*Assistant Examiner* — Zesheng Xiao
(74) *Attorney, Agent, or Firm* — Harrington & Smith

(57) ABSTRACT

Method, device, computer program and apparatus are disclosed for: receiving by a first node from a second node a request for a resource controlled by a first node; and determining by the first node whether the request is authorized; wherein the determining includes: receiving from the second node a cryptocurrency transaction message indicative of a payment; and verifying credibility of the cryptocurrency transaction message.

19 Claims, 2 Drawing Sheets

(51) Int. Cl.
G06Q 20/36 (2012.01)
H04L 9/00 (2006.01)
G09C 1/00 (2006.01)
G06Q 20/40 (2012.01)

(52) U.S. Cl.
CPC ..... *G06Q 20/3678* (2013.01); *G06Q 20/4016* (2013.01); *G09C 1/00* (2013.01); *H04L 9/00* (2013.01); *G06Q 2220/00* (2013.01); *H04L 2209/56* (2013.01)

(58) Field of Classification Search
CPC .. G06Q 2220/00; G09C 1/00; H04L 2209/56; H04L 9/00
USPC .......................................................... 705/609
See application file for complete search history.

(56) References Cited

U.S. PATENT DOCUMENTS

| | | | |
|---|---|---|---|
| 2008/0313079 A1* | 12/2008 | Van Bosch | G06Q 20/20 705/44 |
| 2009/0132813 A1* | 5/2009 | Schibuk | G06Q 20/389 713/158 |
| 2012/0046012 A1* | 2/2012 | Forutanpour | G06F 21/71 455/411 |
| 2012/0130905 A1* | 5/2012 | Tsudik | H04L 63/0823 705/75 |
| 2013/0085945 A1 | 4/2013 | Schultz | |
| 2014/0046818 A1 | 2/2014 | Chung et al. | |

FOREIGN PATENT DOCUMENTS

| | | |
|---|---|---|
| CN | 202394235 U | 8/2012 |
| CN | 103136855 A | 6/2013 |
| WO | 2006/023599 A2 | 3/2006 |

OTHER PUBLICATIONS

"Draft Charter V0.9c—Authentication and Authorization for Constrained Environment (ACE)", IETF, Retrieved on Jul. 31, 2017, Webpage available at: https://trac.ietf.org/trac/core/wiki/ACE_charter.

"Cryptocurrency", Wikipedia, Retrieved on Jul. 31, 2017, Webpage available at: https://en.wikipedia.org/wiki/Cryptocurrency.

Tehranti et al., "A Survey of System Platforms for Mobile Payment", Fourth International Conference on Management of e-Commerce and e-Government (ICMeCG), Oct. 23-24, 2010, pp. 376-381.

Mainetti et al., "IDA-Pay: An Innovative Micro-Payment System Based On NFC Technology For Android Mobile Devices", 20th International Conference on Software, Telecommunications and Computer Networks, Sep. 11-13, 2012, 6 pages.

"Bitcoin", Wikipedia, Retrieved on Jul. 31, 2017, Webpage available at: https://en.wikipedia.org/wiki/Bitcoin.

"Welcome to the Bitcoin Wiki", BitcoinWiki, Retrieved on Jul. 31, 2017, Webpage available at: https://en.bitcoin.it/wiki/Main_Page.

"Blockchain Size", Blockchain, Retrieved on Jul. 31, 2017, Webpage available at: https://blockchain.info/charts/blocks-size.

"Apple Removes Blockchain, Last Bitcoin Wallet App, from iOS App Store", PCWorld, Retrieved on Jul. 31, 2017, Webpage available at: http://www.pcworld.com/article/2095060/apple-removes-blockchain-last-bitcoin-wallet-app-from-mobile-store.html.

"How Bitcoin Works Under the Hood", YouTube, Retrieved on Jul. 31, 2017, Webpage available at: https://www.youtube.com/watch?v=Lx9zgZCMqXE.

Nakamoto, "Bitcoin: A Peer-to-Peer Electronic Cash System" Bitcoin, 2008, pp. 1-9.

Shelby et al., "Constrained Application Protocol (CoAP) Draft-Ietf-Core-Coap-18", CoRE Working Group, internet Dratft, Jun. 28, 2013, pp. 1-118.

Shelby, "Constrained RESTful Environments (CoRE) Link Format", Internet Engineering Task Force (IETF), RFC 6690, Aug. 2012, pp. 1-23.

"Protocol Documentation", Bitcoin Wiki, Retrieved on Jul. 31, 2017, https://en.bitcoin.it/wiki/Protocol_documentation#tx.

Peck, "The Cryptoanarchists' Answer To Cash", IEEE Spectrum, vol. 49, No. 6, Jun. 2012, pp. 50-56.

Wilusz et al., "The Architecture Of Coupon-based, Semi-Off-Line, Anonymous Micropayment System For Internet Of Things", Doctoral Conference on Computing, Electrical and Industrial Systems, 2013, pp. 125-132.

"Leveraging E-Commerce On The Internet Of Things", SyscomCipher, Retrieved on Feb. 28, 2014, http://syscomcipher.com/leveraging-e-commerce-internet-things/.

"The Internet Of Things Outlook For 2014: Everything Connected And Communicating", ZDNet, Retrieved on Jul. 31, 2017, Webpage available at: http://www.zdnet.com/article/the-internet-of-things-outlook-for-2014-everything-connected-and-communicating/.

"The Internet of Things in Japan", Huawei, Retrieved on Aug. 9, 2017, Webpage available at: http://www.huawei.com/en/publications/winwin-magazine/1 1/HW_110849.

Extended European Search Report received for corresponding European Patent Application No. 14886706.2, dated Jul. 31, 2017, 7 pages.

International Search Report and Written Opinion received for corresponding Patent Cooperation Treaty Application No. PCT/FI2014/050223, dated Dec. 18, 2014, 13 pages.

Wikipedia: Bitcoin network [online], archived Mar. 3, 2014 [retrieved on Dec. 5, 2014] Retrieved from the Internet: <URL: http://en.wikipedia.org/w/index.php?title=Bitcoin_network&oldid=597899275> Sections Payment verification. Bitcoin wallets.

Extended European Search Report received for corresponding European Patent Application No. 14886706.2, dated Mar. 21, 2018, 5 pages.

Yue et al., "Bit World", Personal Computer, Issue No. 6, Jun. 2013, 37 pages.

\* cited by examiner

METHOD AND APPARATUS FOR AUTOMATIC INTER-DEVICE AUTHORISATION

RELATED APPLICATION

This application was originally filed as PCT Application No. PCT/FI2014/050223 filed Mar. 27, 2014.

TECHNICAL FIELD

The present application generally relates to automatic inter-device authorization.

BACKGROUND

This section illustrates useful background information without admission of any technique described herein representative of the state of the art.

The Internet enables people to obtain and deliver information over communicatively networked nodes or elements that are capable of communicating with another node and optionally forwarding information received from one node to another node. Internet of Things (IoT) is a concept that refers to a network formed by devices or things that obtain and deliver information by themselves. A node may transmit information on its own motion or responsively to a remote trigger such as a request from another node. For example, grocery goods can be equipped with radio frequency identification tags that are configured to indicate for a charging system items collected to a shopping cart by a customer in a shop so as to remove the need of unloading the shopping cart for manual listing of items being purchased. In the Internet of Things, a fridge can be configured to monitor its status and automatically order supplement from a grocery shop with home delivery and a shop can be configured to automate the ordering of supplements based on real-time consumption. Generally, the Internet of Things may be understood as a system configured to produce communications between things and other things, things and human beings, things and networks. The Internet of Things may be used to facilitate identification, management and control operations, for instance.

On top of the aforementioned examples, the Internet of Things will likely enable numerous more sophisticated services that are still difficult to predict, just as it would have been difficult to predict the development of the social media of the present time. However, it can be expected that the decreasing price and energy consumption of communicating circuitries will drive a significant increase in the number of interconnected devices or things in the Internet of Things. For example, it has been speculated that by 2020, there could be 50 billion nodes in the Internet of Things.

The Internet access is typically arranged through a paid Internet subscription that operates over a fixed line or mobile Internet connection. Such connections terminate to their users through access points such as ADSL modems or cellular modems. In some occasions, e.g. with some lap-top computers, end-user devices are readily equipped with modems. It is also possible to share the Internet access to others. For example, WLAN roaming systems have been produced in which members of a community or closed group have gained access to the Internet via each others' WLAN access points. At simplest, the WLAN access can be granted to everyone by leaving the access point open to everyone without any cryptographic authentication. However, such an open Internet access is exposed to abuse of various kinds and community based access may require using shared access credentials in many access points or building customized access control systems. It is thus rather difficult to arrange reasonably controlled sharing of Internet resources concerning fairly well-connected and computationally well-equipped devices such as ADSL/WLAN access points of homes and businesses. With the Internet of Things, the expected rapid growth is based on the idea that the equipment needed is extremely simple, constrained in resources such as processing power and memory, may have sporadic connectivity, and possibly powered by other devices (e.g. as with the RFID) so that the nodes are heavily constrained in terms of connectivity and computation resources.

SUMMARY

Various aspects of examples of the invention are set out in the claims.

According to a first example aspect of the present invention, there is provided a method comprising:

receiving by a first node from a second node a request for a resource controlled by a first node; and determining by the first node whether the request is authorized;

wherein the determining comprises:

receiving from the second node a cryptocurrency transaction message indicative of a payment; and verifying credibility of the cryptocurrency transaction message.

The first node may be a node of the Internet of Things.

The second node may be a node of the Internet of Things.

The verifying credibility of the cryptocurrency transaction message may comprise checking plausibility of cryptocurrency transaction message.

The method may further comprise granting the request for the resource.

The requested resource may be granted responsively to positively checking the plausibility of cryptocurrency transaction message.

The method may further comprise informing a cryptocurrency network of the cryptocurrency transaction message after the granting of the requested resource to the second node.

The method may further comprise verifying the credibility of the cryptocurrency transaction message from a cryptocurrency network after the granting of the requested resource.

The verifying credibility of the cryptocurrency transaction message may comprise requesting transaction confirmation from a first cryptocurrency wallet associated with the first node.

The second node may obtain the cryptocurrency transaction message from a second cryptocurrency wallet associated with the second node.

The informing of the cryptocurrency network may be performed by the first cryptocurrency wallet.

The informing of the cryptocurrency network may be performed by the first cryptocurrency wallet or by the second cryptocurrency wallet.

The verifying of the credibility of the cryptocurrency transaction message may be performed by the first cryptocurrency wallet.

The second node may notify the second cryptocurrency wallet whether resource was successfully obtained.

The method may further comprise the first device identifying itself in a device discovery process. The first and second nodes may discover each other in the device discovery process. The device discovery process may be performed using a process defined by any one or more of: a universal plug and play device discovery process; IETF Constrained Application Protocol (Draft-ietf-core-coap-18.txt); and RFC6690.

The first cryptocurrency wallet may be a collective entity formed of a plurality of cryptocurrency wallets of same or different types.

The second cryptocurrency wallet may be a collective entity formed of a plurality of cryptocurrency wallets of same or different types.

The first node may provide the second node with first payment particulars. The first node may provide the second node with first payment particulars in a device discovery process. The first payment particulars may comprise any of: first wallet address; public key associated with the first wallet; quality of available resource; quantity of available resources; and price for obtaining requested resource. The quality of the available resource may comprise the time or interval of time in which the resource will be granted to be available.

The cryptocurrency may be Bitcoin.

According to a second example aspect of the present invention, there is provided a method comprising:

identifying by a second node a presence of a first node that controls a resource;

receiving from the first node a requirement of a payment;

sending by a second node to a first node a request for the resource, the request comprising a cryptocurrency transaction message indicative of the payment for verifying by the first node to determine whether the request is authorized;

The second node may obtain the cryptocurrency transaction message from a second cryptocurrency wallet associated with the second node.

The second node may notify the second cryptocurrency wallet whether resource was successfully obtained.

The method may further comprise the second device identifying itself in a device discovery process. The first and second nodes may discover each other in the device discovery process. The device discovery process may be performed using a process defined by any one or more of: a universal plug and play device discovery process; IETF Constrained Application Protocol (Draft-ietf-core-coap-18.txt); and RFC6690.

The second node may receive from the first node first payment particulars. The second node may receive the first payment particulars in a device discovery process. The first payment particulars may comprise any of: first wallet address; public key associated with the first wallet; quality of available resource; quantity of available resources; and price for obtaining requested resource. The quality of the available resource may comprise the time or interval of time in which the resource will be granted to be available.

The cryptocurrency may be Bitcoin.

The term node may refer to any intercommunication enabled unit that may be terminated or interconnected between two or more other intercommunication enabled unit.

The second node may automatically send the request for the resource. The second node may comprise predefined service requesting rules. The second node may decide whether to request for the resource based on the service requesting rules. The second node may perform the automatically sending the request for the resource based on the service requesting rules.

According to a third example aspect of the present invention, there is provided a computer program comprising computer executable program code configured to execute any method of the first or second example aspect.

The computer program may be stored in a computer readable memory medium.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

According to a fourth example aspect of the present invention, there is provided an apparatus comprising a memory and a processor that are configured to cause the apparatus to perform the method of the first example aspect.

According to a fifth example aspect of the present invention, there is provided an apparatus comprising a memory and a processor that are configured to cause the apparatus to perform the method of the second example aspect.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1:
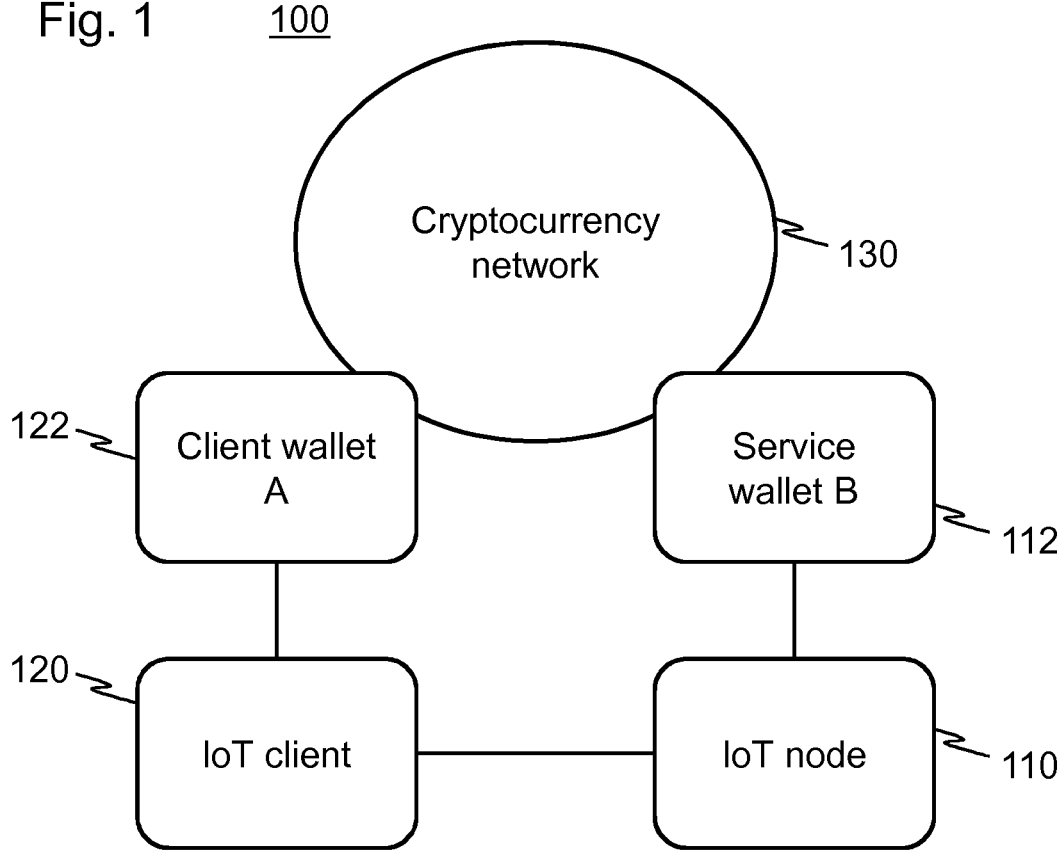
FIG. 1 shows an architectural drawing of a system of an example embodiment.
Figure 3:
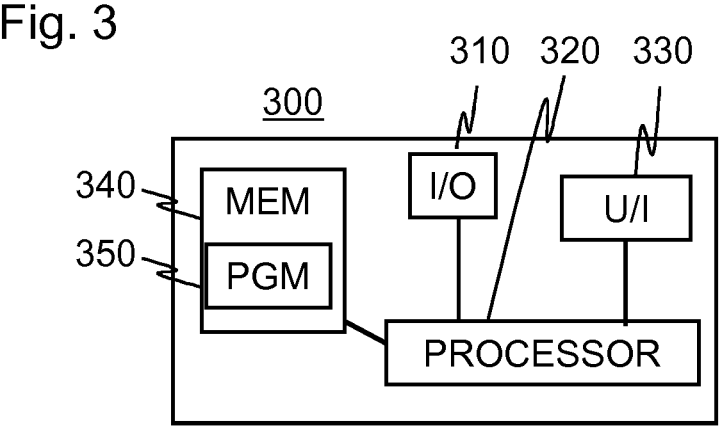
FIG. 3 shows a block diagram of an apparatus of an example embodiment.
Figure 2:
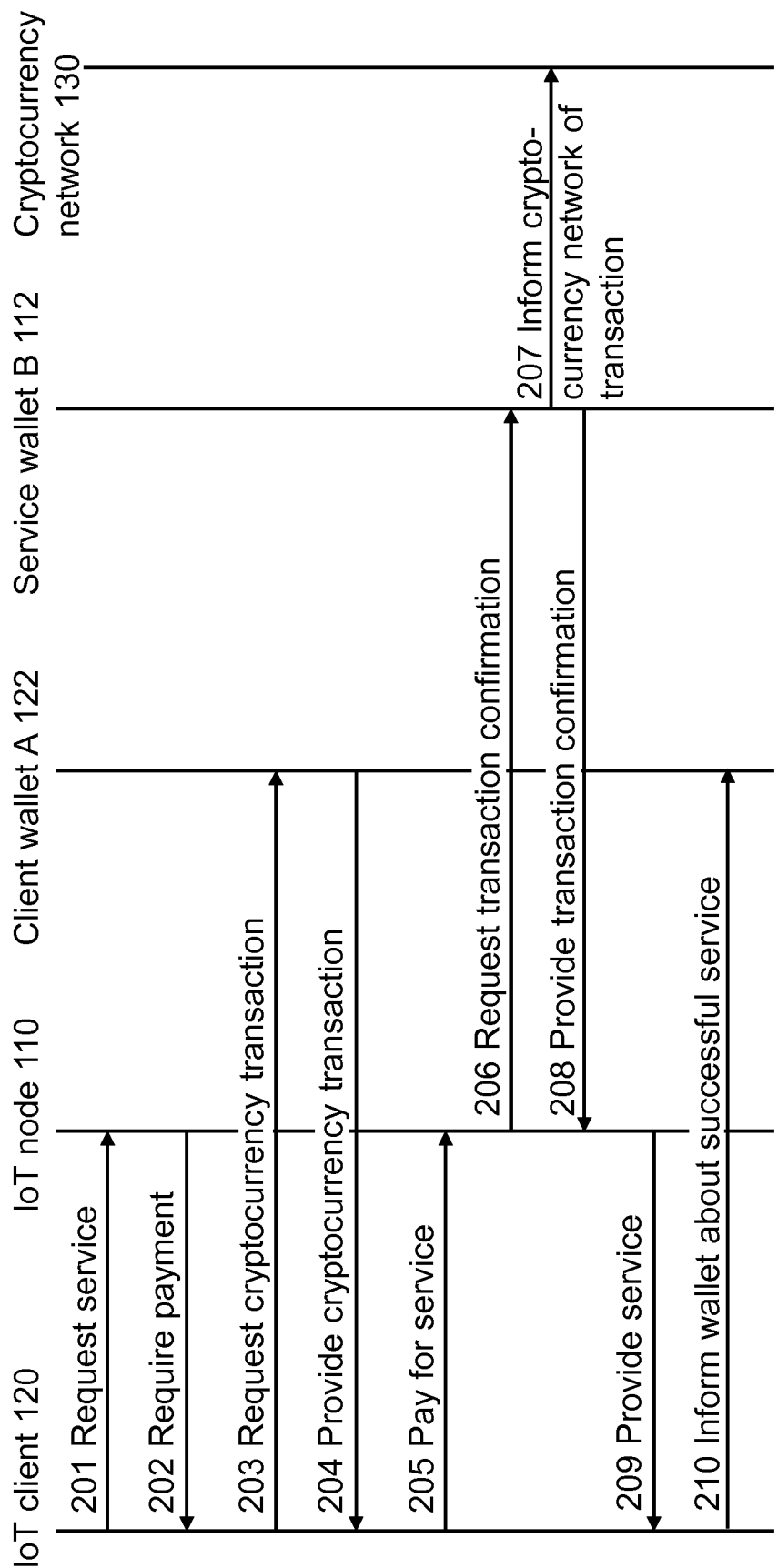
FIG. 2 shows a flow chart of a process of an example embodiment.

An example embodiment of the present invention and its potential advantages are understood by referring to FIGS. 1 through 3 of the drawings. In this document, like reference signs denote like parts or steps.

FIG. 1 shows an architectural drawing of a system 100 of an example embodiment. In FIG. 1, a cryptocurrency is used for effecting of a payment for a second Internet of a Things (IoT) node 120 to use a resource or service of a first IoT node 110. FIG. 1 further illustrates a first cryptocurrency wallet 112 also referred to sometimes as a Service wallet B; a second cryptocurrency wallet 122 also referred to sometimes as a Client wallet A; and a cryptocurrency network 130. The first cryptocurrency wallet 112 can be a functionality built in a device that also acts as the first node 110. Alternatively, the first cryptocurrency wallet 112 can be hosted by an external server or computing cloud. The second cryptocurrency wallet 122 can be a functionality built in a device that also acts as the second node 120. Alternatively, the second cryptocurrency wallet 122 can be hosted by an external server or computing cloud.

In an example embodiment, the first cryptocurrency wallet 112 is a collective entity formed of a plurality of cryptocurrency wallets of same or different types.

In an example embodiment, the second cryptocurrency wallet is a collective entity formed of a plurality of cryptocurrency wallets of same or different types.

The operation of the cryptocurrency network and of the cryptocurrency wallets can be implemented e.g. as in the present Bitcoin. However, it should be understood that the technology behind bitcoin can be used for multitude of cryptocurrencies including the presently well-known Bitcoin, while Bitcoin is just the one example of a cryptocurrency or bitcoin that can be used in this or other example embodiments of this document. Indeed, in this document, reference to bitcoin without capital or term cryptocurrency refers to technology, and not to the particular Bitcoin. Moreover, the cryptocurrency need not be exchangeable with real money but instead may represent tokens of some kind such as favor tokens. For example, the cryptocurrency can be solely used for fairly allowing IoT owners to borrow resources of others lot owners in proportion to the lending of their own resources.

Generally, a bitcoin wallet keeps its copy of ledger information, stores all transactions ever made in bitcoin network, holds public and private keys, and communicates with the bitcoin network. An establishment of a new wallet can take a day or more as the wallet builds up this database, which is for Bitcoin currently around 14 GB of size. The first and second cryptocurrency wallets 112, 122 can be implemented in this manner.

A payment in bitcoin is effected by payer A or the second node 120 sending bitcoin money to payee B or the first node 110 by using A's private key to sign the bitcoin transaction, which payee B can verify by using A's public key. The payer A uses payee B's public key as the destination for the transaction. This knowledge, i.e. A's signature, B's public address, and signed bitcoin transaction message is also shared into bitcoin network (cryptocurrency network 130 in FIG. 1). A bitcoin transaction is a broadcast event in a peer-to-peer network, where it takes time for receiver of transaction to take a note of transaction performed by sender. This allows the bitcoin network to verify that it was the payer A that send the money to the payee B, and as the bitcoin network knows all past transactions, it can verify that the payer A actually has had enough money to pay to the payee B.

Public key cryptography is a part of the bitcoin network. A block chain is maintained for a wallet by learning of all transactions that have ever been made, which task is poorly suited for a constrained node to handle. Even modern smartphones may struggle with the processing for wallet maintenance. However, once the wallet has synchronized its state with the cryptocurrency network, the wallet can keep index of unused inputs per bitcoin network node and hence quickly check e.g. if a node willing to make a payment to the wallet has enough bitcoins to pay for a new transactions.

If the cryptocurrency network is not kept updated for transactions that have taken place, a malicious party can try to double spend money, i.e. use one money input to pay multiple times. For fast transactions that cannot wait for block chain confirmations that can take around 10 minutes at this moment, double spending attacks are possible. However, double spending corresponds to frauds with wrong money and uncovered checks that are legally penalized crimes.

In an example embodiment, at least one of the first and second nodes 110, 120 is a resource constrained device the processing power and/or energy reserve of which is insufficient for online verification of cryptocurrency payments with the cryptocurrency network.

According to an example embodiment, means are provided for enabling Internet of Things transactions where constrained IoT client devices pay for transactions they make with constrained IoT nodes with a cryptocurrency (such as Bitcoin) with help of remote wallets (that are connected to cryptocurrency network) for both IoT clients and IoT nodes. In order to simplify description, term node may be used to refer to a unit that may grant authorization to a resource whereas the term client may be used to refer to a unit that may request for such an authorization. The IoT client may also be termed as a second node and the IoT node as a first node.

In FIG. 1, the IoT node (a first node) is a unit that is providing service being bought (or authorized), and an IoT client (second node) is a unit buying the service or requesting authorization to a resource. Correspondingly, the IoT client is using Client wallet A (second wallet) that is expected to locate e.g. in cloud. In case of powerful IoT client, the Client wallet can also reside at the IoT client as a software module. Service wallet B (first wallet) is the wallet used by IoT node. The service wallet B does not typically reside in the (constrained) IoT node, but e.g. in a cloud or external server instead.

The constrained IoT node has a communication connection to a remote wallet. The connection can be, for example, an always-on connection, a periodic connection, or an on-demand connection as requested by the Service wallet B. The Service wallet B can be used by one or more IoT nodes.

When the IoT node is accessed by the IoT client (e.g. mobile handset used by person or other autonomous IoT node), the IoT node requires a cryptocurrency payment for completing the transaction. Depending on preferred trust level, timing needs, and taking resource constraints into account, the IoT node can perform one of the following options:

1) Accept cryptocurrency transaction message without immediate verification and instead provide the IoT node's service or requested resource immediately.

2) Verify received cryptocurrency payment (transaction message) first with the Service wallet B only, and once that accepts the transaction (e.g. if the transaction message appears plausible) then provide the IoT node's service. Delay incurred is roughly packet round trip time from the IoT node to the Service wallet B.

3) Wait for cryptocurrency transaction to be confirmed by cryptocurrency network before accepting the cryptocurrency payment (i.e. accepting the transaction message). This could take for a relatively long time, such as several minutes (e.g. 10 min), depending on how many confirmations are required from the cryptocurrency network.

Different use cases can be identified for the aforementioned three different options. For instance, Option 1 may be useful in cases where small fraud (e.g. double spending) is not a problem, as it would be enough if most of the people or machines using an IoT node would honestly pay for it. This is like in grocery stores that have priced in damage caused by shoplifters. If fraud for double spending is rare enough, Option 1 can be cost efficient as the IoT node can store cryptocurrency transactions for a long time before they are collected into Service wallet B and entered into cryptocurrency network. Long time depends on case and can be hours, days or even weeks. Option 2, on the other hand, provides additional security over Option 1 with cost of energy consumed for transaction back to Service wallet B. This would protect against cases where payer has obviously no money, signature checks fail or where obvious double spending is attempted. Option 3 provides still better protection against fraud, but requires that there is sufficient time to wait for cryptocurrency transaction to complete and be confirmed by the cryptocurrency network. Further or other use cases may be thought of as well.

The choice of an option can be fixed so that given nodes interact always in a given way. On the other hand, it is possible to configure the first node to select the option based on set criterion or criteria such as the type of resource being authorized or service being sold; amount of earlier transactions with the second node; random selection to require more secure verification e.g. once in N transactions, wherein N ranges between 2 and 1000. In some cases N is greater than 2, 3, 4, 5, 10 or 20. In some cases N is smaller than 3, 4, 5, 10, 20, 50, 100 or 200 (as long as the upper limit is selected to be greater or equal to the lower limit).

In an example embodiment, the IoT client 120 accessing the IoT node 110 is also constrained and unable to handle the task of cryptocurrency wallet maintenance. The IoT client 120 then contacts a remote Client wallet A 122 (e.g. implemented as a cloud service) for creating a message for cryptocurrency transaction. The IoT client 120 passes payment related information received from the IoT node 110 to the Client wallet A 122, which calculates cryptocurrency transaction message and returns it back to IoT client 120. The IoT client 120 then passes the cryptocurrency transaction message for the IoT node 110. From the IoT node's point of view it does not matter whether cryptocurrency transaction message is created by the IoT client 120 or by the Client wallet A 122.

The moment of letting the cryptocurrency network to know about payment transaction taking place has multitude of implementation choices. For example, the Service wallet B 112 may let the cryptocurrency network know of transaction as soon as it:
A) learns from the IoT node 110 the transaction is going to take place; or
B) learns from the IoT node 110 the transaction has taken place, possibly long after transaction having actually taken place.
Additionally or alternatively, the Client wallet A 122 can be configured to let the cryptocurrency network know about transaction after hearing from the IoT client 120 that it successfully received service from the IoT node 110.

An example of the full exchange with Option 2) and A) is illustrated in following message sequence chart of FIG. 2:

201: The IoT client 120 requests a service or resource from the IoT node 110.

202: The IoT node 110 informs the IoT client 120 that service costs and the Service wallet B's 112 information, such as the address of the Service wallet B 112.

203: The IoT client 120 passes received information to the Client wallet A 122 and requests cryptocurrency transaction message.

204: The Client wallet A 122 creates cryptocurrency transaction message (in case of bitcoin this is the "tx" message), but does not submit the message to the cryptocurrency network. Hence no cryptocurrency is yet transferring hands. Instead, the Client wallet A 122 provides the transaction message to the IoT client 120. At this point the Client wallet A 122 has to mark the cryptocurrency amount as tentatively spent and hence the Client wallet A 122 must not double this amount, but instead wait for the IoT client 120 to inform whether the cryptocurrency was successfully spent or not.

205: The IoT client 120 provides the cryptocurrency message to the IoT node 110 and thereby pays for the service. In an example embodiment, a trusting IoT node 110 provides service at this point right away without immediately checking the legitimacy of transaction.

206: The IoT node requests its Service wallet B 112 to confirm the payment. At this point, in an example embodiment, the Service wallet B 112 checks the transaction message's validity against its copy of cryptocurrency block chain and determines if the IoT client 110 has funds it is attempting to pay in cryptocurrency transaction message.

207: The Service wallet B 112 informs cryptocurrency network of transaction taking place by forwarding the cryptocurrency transaction (in case of bitcoin the "tx message") received originally from Client wallet A 122. After this cryptocurrency changes hands.

208: The Service wallet B 112 provides a transaction confirmation to the IoT node 110 i.e. informs the IoT node about successful payment.

209: The IoT node 110 provides service for the IoT client 120

210: The IoT client 120 inform its Client wallet A 122 about successful transaction. The Client wallet A 122 marks the cryptocurrency used. At this point the Client wallet A 122 also submits in an example embodiment the transaction to the cryptocurrency network (not shown) and thereby clears its data structures.

For additional reliability, further messages could be used. It is also possible to have error scenarios, such as devices running out of battery or losing connectivity middle of transactions. Some of these case can be handled by timeouts, e.g. Client wallet A 122 canceling transaction in case it does not hear success (or fail) of transaction in timely manner. As in all money uses, it could happen that Server wallet B 112 informs network about used cryptocurrency, even though IoT client 120 did not get service or Client wallet A 122 did not get success notification from IoT client 120. In cases such as these usual reclamation systems would need to be used—owner of IoT client 120 contacting owner of IoT node 110 and claiming back possibly paid cryptocurrency but that did not result in service delivery. Moreover, in case that there are plural cryptocurrency wallets that jointly form a first or second cryptocurrency wallet 112, 122, separate signaling can be provided for negotiating the cryptocurrency to be used.

Use Example

Before any action between IoT client 120 and IoT node 110 take place, devices discover each other. This is implemented, for example, in IETF's Constrained Application Protocol (CoAP) (draft-ietf-core-coap-18.txt) by nodes sending unicast or multicast request to resource called ./well-known/core (rfc6690).

At least two approaches are possible with CoAP:
1) The IoT client 120 learns the IoT node's 110 Service wallet B's 112 address, or public key (target for cryptocurrency transaction) and price for performing actions during resource discovery phase; or
2) the IoT client 120 learns the IoT node's 110 Service wallet B's 112 address and price as response to service transaction the IoT client 120 attempts to perform.

The requesting IoT client 120 can pay the transaction by at least two different ways when using CoAP:

1) Include a signed cryptocurrency transaction message as part of the transaction message (e.g. CoAP GET/PUT); or
2) perform the payment before actual data transaction occurs (e.g. via separate CoAP PUT message).

In either case, in an example embodiment, the requestor is informed of expected time the transaction would take. This allows the IoT client 120 to either choose to wait for confirmations or not to wait.

In future, other cryptocurrencies may emerge, or improvements for current bitcoin to occur, that allows faster confirmations and makes option three more usable.

Let us look in more detail at how to implement the two different ways for requesting the IoT client 120 to pay the transaction with examples based on changes to the CoAP protocol in sake of further clarity, whereas it is also possible to use the CoAP without necessitating additions to the CoAP:

A) The IoT client 120 learns about price while attempting transactions.

1) The IoT client 120 sends a CoAP GET request to the IoT node 110 for /sensor/temperature1 resource.

2) The IoT node 110 responds with new client error status code, such as 4.16 Payment required, for example. The error reply has in its payload (or alternatively in a new CoAP option) a standard-formatted string indicating information required for payment. In the case of bitcoin, this string contains all the information the Client wallet A 122 needs to generate a cryptocurrency transaction message that will be acceptable for Service wallet B (the "tx" message described in https://en.bitcoin.it/wiki/Protocol_specification#tx). The string can be JSON formatted, for example. The data bits needed for bitcoin are at least version number, address for Service wallet B, and cost of the service.

3) The IoT client 120 requests Client wallet A 122 for a cryptocurrency transaction message, and gets one. This can happen by using CoAP over DTLS, HTTP over TLS, or some other protocol.

4) The IoT client 120 resends CoAP GET request to IoT node 110 for /sensor/temperature1 resource and includes a new CoAP option that contains cryptocurrency transaction message, which should be binary encoded in order to save space. In essence, this could be bitcoin "tx" message received from Client wallet A 122.

5) The IoT node 110 replies in standard fashion to the CoAP GET either immediately, or via consulting Service wallet B as mentioned before.

B) The IoT client 120 learns about the price before doing actual transaction.

1) The IoT client 120 sends a CoAP GET request to the IoT node 110 for /well-known/cost/sensor/temperature1 (or some other resource that is known to contain the price, there could also be a well-known resource that indicates if the IoT node requires some form of payment, and only after that query for the exact price would be made)

2) the IoT node replies with CoAP success and includes the cost and payment information as in A-2 in the foregoing.

3) The IoT client 120 requests the Client wallet A 122 for transaction message, as in A-3 in the foregoing.

3A) The IoT client 120 includes the cryptocurrency transaction message in CoAP GET as in A-4 above.

3B) (Alternatively) The IoT client 120 pushes cryptocurrency transaction message first via CoAP PUT to the IoT node, which then replies with OK if the payment is fine, or error if not.

4) If the IoT node 110 replied success, the IoT client 120 performs CoAP GET as usual and the IoT node 110 allows it as it has received payment (in this case IoT client 120 would be authenticated e.g. by some TOKEN received as a response to CoAP PUT message that delivered cryptocurrency transaction to the IoT node 110).

Various embodiments of this document are fully agnostic on the access technology used. Suitable communication technologies include various short range and long range wireless technologies such as NFC, IEEE 802.15.4, ZigBee, Bluetooth, Bluetooth Low-Energy, WiFi, LTE, GSM, IS-95, CDMA-2000, and W-CDMA, and also various wired technologies such as IEEE 802.3 and USB.

While CoAP is referred in the foregoing, the protocol for the IoT client 120 and the IoT node 110 communications can be implemented using any suitable protocols such as new or proprietary protocols or existing protocols such as the Hypertext Transfer Protocol (HTTP), Message Queuing Telemetry Transport (MQTT), a peer-to-peer technology such as AllJoyn, Short Message Service (SMS), or Multimedia Messaging Service (MMS).

FIG. 3 shows a block diagram of an apparatus 300 according to an embodiment of the invention. The apparatus 300 is usable e.g. as an IoT node 110 or as an IoT client 120. It is also understood that one device (e.g. apparatus 300) can be configured to act at one time as an IoT node 110 and at another time as an IoT client 120 or even in both functions at the same time.

The apparatus 300 comprises a memory 340 including a persistent computer program code 350 and the terminal's private identity. The apparatus 300 further comprises a processor 320 for controlling the operation of the apparatus 300 using the computer program code 350, a communication unit 310 for communicating with other nodes and with the cryptocurrency network. The communication unit 310 comprises, for example, a local area network (LAN) port; a wireless local area network (WLAN) unit; Bluetooth unit; cellular data communication unit; or satellite data communication unit. The processor 320 comprises, for example, any one or more of: a master control unit (MCU); a microprocessor; a digital signal processor (DSP); an application specific integrated circuit (ASIC); a field programmable gate array; and a microcontroller. The apparatus further comprises a user interface (U/I) 330 coupled to the processor 320.

Without in any way limiting the scope, interpretation, or application of the claims appearing below, a technical effect of one or more of the example embodiments disclosed herein is that no money or credit card information needs to be loaded on the IoT client, hence theft or losing of the IoT client does not necessarily result in loss of money. This means that no secure elements (such as SIM cards or embedded SE hardware) are necessary on the IoT node and on the IoT client as long as the Client wallet A is able to identify the IoT client so that it does not allow just anyone to ask for cryptocurrency transaction messages. If the IoT client or the IoT node is lost, wallets can be simply blacklist as lost devices to prevent use of their cryptocurrency.

Another technical effect of one or more of the example embodiments disclosed herein is that the IoT client does not need bank accounts, credit cards, or identity. While it is not a problem for a person to have identity, for machines it might be. It would be simpler if some machines were loaded with access to some cryptocurrency the machine can use to access other machines, without the system being bound to real bank accounts or credit card identities. E.g. an autonomous car could pay road toll or parking in a parking hall with cryptocurrency. This means the system can gain benefits of cryptocurrencies and work without centralized servers, and hence work in case of various disturbances (e.g. a DoS attack against a bank server responsible for credit card payment clearance).

Another technical effect of one or more of the example embodiments disclosed herein is that the IoT node access can remain as anonymous as used cryptocurrency is, hence the IoT client's privacy can be protected when accessing the IoT nodes, unlike with the use of credit or debit cards for payments.

Another technical effect of one or more of the example embodiments disclosed herein is that the IoT node does not need to have continuous Internet connectivity—it does not necessarily have to validate transactions on the fly such as with most other payment systems. And even when not validated on the fly by the IoT node, payee (the IoT client), cannot double spend the money without committing crime and risk getting caught. The IoT node can collect cryptocurrency transactions and provide them e.g. in batch or bulk transfers to the Service wallet B (or e.g. as collected electronically remotely or locally e.g. via a person coming to "manually" read the IoT node's payment cache).

Another technical effect of one or more of the example embodiments disclosed herein is that in bitcoin technology transaction fees are minuscule, and hence well suited for nanopayments that can make automated IoT access to truly proliferate.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a computer described and depicted in FIG. 3. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

The invention claimed is:

1. A method comprising:
   identifying, with a first device, itself to a second device in a device discovery process over a wireless network, the wireless network comprising a cryptocurrency blockchain network;
   receiving with the first device in the cryptocurrency blockchain network from the second device a request for a resource controlled with the first device;
   determining with the first device whether the request is authorized;
   wherein the determining with the first device whether the request is authorized comprises:
      receiving with the first device from the second device a cryptocurrency transaction message indicative of a payment, the cryptocurrency transaction message having been signed with use of a private key of the second device and sent to the first device with use of a public key of the first device as a destination address;
      wherein the second device obtains the cryptocurrency transaction message from a second remote cryptocurrency wallet associated with and remote from the second device, the second remote cryptocurrency wallet hosted with a second external server or a second computing cloud; and
      verifying credibility of the cryptocurrency transaction message, wherein verifying the credibility of the cryptocurrency transaction message comprises:
      verifying, using a public key of the second device, that the cryptocurrency transaction message has been signed with the use of the private key of the second device;
      performing randomly at least once in N transactions, wherein N is an integer greater than or equal to two, either: verifying the cryptocurrency transaction message with a first remote cryptocurrency wallet associated with and remote from the first device, the first remote cryptocurrency wallet hosted with a first external server or a first computing cloud, or waiting for the cryptocurrency transaction message to be confirmed with the cryptocurrency blockchain network; and for other transactions,
      deciding not to further verify the credibility of the cryptocurrency transaction message, in response to the first device immediately trusting the second device;
      verifying the cryptocurrency transaction message with the first remote cryptocurrency wallet associated with the first device without waiting for the cryptocurrency transaction message to be confirmed with the cryptocurrency blockchain network, in response to both the first device not immediately trusting the second device and there not being sufficient time for the cryptocurrency transaction message to be confirmed with the cryptocurrency blockchain network; and
      waiting for the cryptocurrency transaction message to be confirmed with the cryptocurrency blockchain network, in response to the first device not immediately trusting the second device, and in response to there being sufficient time for the cryptocurrency transaction message to be confirmed with the cryptocurrency blockchain network; and
   granting the requested resource to the second device over the wireless network in response to the determining with the first device that the request is authorized.

2. The method of claim 1, wherein the first device is a constrained device.

3. The method of claim 1, wherein the second device is a constrained device.

4. The method of claim 1, wherein the requested resource is granted responsively to positively checking a plausibility of the cryptocurrency transaction message.

5. The method of claim 4, further comprising informing the cryptocurrency blockchain network of the cryptocurrency transaction message after the granting of the requested resource to the second device.

6. The method of claim 5, wherein the informing of the cryptocurrency blockchain network is performed with the first cryptocurrency remote wallet.

7. The method of claim 5, wherein the informing of the cryptocurrency blockchain network is performed with the first remote cryptocurrency wallet associated with the first device, or the cryptocurrency blockchain network is informed of the granting of the requested resource to the second device with the second remote cryptocurrency wallet associated with the second device.

8. The method of claim 1, wherein the second remote cryptocurrency wallet is notified of whether the resource was successfully obtained with the second device.

9. The method of claim 1, wherein the first device provides the second device with first payment particulars.

10. The method of claim 9, wherein the first device provides the second device with the first payment particulars in the device discovery process.

11. The method of claim 10 wherein the first payment particulars comprise any of: an address of the first remote cryptocurrency wallet associated with the first device; a public key associated with the first remote cryptocurrency wallet associated with the first device; a quality of available resource; a quantity of available resources; and a price for obtaining the requested resource.

12. The method of claim 1, wherein the cryptocurrency transaction message is a broadcast event in the cryptocurrency blockchain network.

13. The method of claim 1, wherein performing either the providing the requested resource of the first device to the second device without further verifying the credibility of the cryptocurrency transaction message, the verifying the cryptocurrency transaction message with the first remote cryptocurrency wallet associated with the first device, or the waiting for the cryptocurrency transaction message to be confirmed with the cryptocurrency network, further depends on a type of resource being authorized, an amount of earlier transactions with the second device, and one or more resource constraints associated with the first or second device.

14. The method of claim 1, wherein at least one of the following processes are implemented using a constrained application protocol:
identifying with the first device to the second device in the device discovery process;
receiving with the first device in the network from the second device the request for the resource controlled with the first device;
receiving from the second device the cryptocurrency transaction message indicative of a payment; and
granting the requested resource to the second device.

15. A method comprising:
identifying, with a second device, itself to a first device in a device discovery process over a wireless network, the wireless network comprising a cryptocurrency blockchain network;
providing with the second device in the cryptocurrency blockchain network to the first device a request for a resource controlled with the first device;
wherein whether the request is authorized is determined;
wherein the determination of whether the request is authorized comprises:
providing with the second device to the first device a cryptocurrency transaction message indicative of a payment, the cryptocurrency transaction message having been signed using a private key of the second device and sent to the first device using a public key of the first device as a destination address;
wherein the second device obtains the cryptocurrency transaction message from a second remote cryptocurrency wallet associated with and remote from the second device, the second remote cryptocurrency wallet hosted with a second external server or a second computing cloud; and
wherein a credibility of the cryptocurrency transaction message is verified, wherein the verification of the credibility of the cryptocurrency transaction message comprises:
a verification, with use of a public key of the second device, that the cryptocurrency transaction message has been signed using the private key of the second device;
at least once in N transactions, wherein N is an integer greater than or equal to two, random performance of either: verification of the cryptocurrency transaction message with a first remote cryptocurrency wallet associated with and remote from the first device, the first remote cryptocurrency wallet hosted with a first external server or a first computing cloud, or a wait for the cryptocurrency transaction message to be confirmed with the cryptocurrency blockchain network; and for other transactions,
a decision not to further verify the credibility of the cryptocurrency transaction message, in response to an immediate trust of the first device for the second device;
the verification of the cryptocurrency transaction message with the first remote cryptocurrency wallet associated with the first device without the wait for the cryptocurrency transaction message to be confirmed with the cryptocurrency blockchain network, in response to both an immediate lack of trust of the first device for the second device and there not being sufficient time for the cryptocurrency transaction message to be confirmed with the cryptocurrency blockchain network; and
the wait for the cryptocurrency transaction message to be confirmed with the cryptocurrency blockchain network, in response to the immediate lack of trust of the first device for the second device, and in response to there being sufficient time for the cryptocurrency transaction message to be confirmed with the cryptocurrency blockchain network; and
receiving a grant for the requested resource with the second device over the wireless network in response to the determination that the request is authorized.

16. The method of claim 15, wherein the request for the resource controlled with the first device is provided automatically with the second device, based on at least one predefined service requesting rule.

17. The method of claim 15, further comprising:
receiving an expected time a transaction associated with the cryptocurrency transaction message is expected to take place; and
cancelling the transaction in response to not receiving the grant for the requested resource after the expected time.

18. An apparatus comprising:

at least one processor; and at least one non-transitory memory including computer program code, the at least one memory and the computer program code configured to, with the at least one processor, cause the apparatus to perform at least:

identifying, with a first device, itself to a second device in a device discovery process over a wireless network, the wireless network comprising a cryptocurrency blockchain network;

receiving with the first device in the cryptocurrency blockchain network from the second device a request for a resource controlled with the first device;

determining with the first device whether the request is authorized;

wherein the determining with the first device whether the request is authorized comprises:

receiving with the first device from the second device a cryptocurrency transaction message indicative of a payment, the cryptocurrency transaction message having been signed with use of a private key of the second device and sent to the first device with use of a public key of the first device as a destination address;

wherein the second device obtains the cryptocurrency transaction message from a second remote cryptocurrency wallet associated with and remote from the second device, the second remote cryptocurrency wallet hosted with a second external server or a second computing cloud; and verifying credibility of the cryptocurrency transaction message, wherein verifying the credibility of the cryptocurrency transaction message comprises:

verifying, using a public key of the second device, that the cryptocurrency transaction message has been signed with the use of the private key of the second device;

performing randomly at least once in N transactions, wherein N is an integer greater than or equal to two, either: verifying the cryptocurrency transaction message with a first remote cryptocurrency wallet associated with and remote from the first device, the first remote cryptocurrency wallet hosted with a first external server or a first computing cloud, or waiting for the cryptocurrency transaction message to be confirmed with the cryptocurrency blockchain network; and for other transactions, deciding not to further verify the credibility of the cryptocurrency transaction message, in response to the first device immediately trusting the second device;

verifying the cryptocurrency transaction message with the first remote cryptocurrency wallet associated with the first device without waiting for the cryptocurrency transaction message to be confirmed with the cryptocurrency blockchain network, in response to both the first device not immediately trusting the second device and there not being sufficient time for the cryptocurrency transaction message to be confirmed with the cryptocurrency blockchain network; and waiting for the cryptocurrency transaction message to be confirmed with the cryptocurrency blockchain network, in response to the first device not immediately trusting the second device, and in response to there being sufficient time for the cryptocurrency transaction message to be confirmed with the cryptocurrency blockchain network; and granting the requested resource to the second device over the wireless network in response to the determining with the first device that the request is authorized.

19. An apparatus comprising:

at least one processor; and at least one non-transitory memory including computer program code, the at least one memory and the computer program code configured to, with the at least one processor, cause the apparatus to perform at least:

identifying, with a second device, itself to a first device in a device discovery process over a wireless network, the wireless network comprising a cryptocurrency blockchain network;

providing with the second device in the cryptocurrency blockchain network to the first device a request for a resource controlled with the first device;

wherein the determination of whether the request is authorized comprises:

providing with the second device to the first device a cryptocurrency transaction message indicative of a payment, the cryptocurrency transaction message having been signed using a private key of the second device and sent to the first device using a public key of the first device as a destination address;

wherein the second device obtains the cryptocurrency transaction message from a second remote cryptocurrency wallet associated with and remote from the second device, the second remote cryptocurrency wallet hosted with a second external server or a second computing cloud; and wherein a credibility of the cryptocurrency transaction message is verified, wherein the verification of the credibility of the cryptocurrency transaction message comprises:

a verification, with use of a public key of the second device, that the cryptocurrency transaction message has been signed using the private key of the second device;

at least once in N transactions, wherein N is an integer greater than or equal to two, random performance of either: verification of the cryptocurrency transaction message with a first remote cryptocurrency wallet associated with and remote from the first device, the first remote cryptocurrency wallet hosted with a first external server or a first computing cloud, or a wait for the cryptocurrency transaction message to be confirmed with the cryptocurrency blockchain network; and for other transactions, a decision not to further verify the credibility of the cryptocurrency transaction message, in response to an immediate trust of the first device for the second device;

the verification of the cryptocurrency transaction message with the first remote cryptocurrency wallet associated with the first device without a wait for the cryptocurrency transaction message to be confirmed with the cryptocurrency blockchain network, in response to both an immediate lack of trust of the first device not for the second device and there not being sufficient time for the cryptocurrency transaction message to be confirmed with the cryptocurrency blockchain network; and the wait for the cryptocurrency transaction message to be confirmed with the cryptocurrency blockchain network, in response to the immediate lack of trust of the first device for the second device, and in response to there being sufficient time for the cryptocurrency transaction message to be confirmed with the cryptocurrency blockchain network; and receiving a grant for the requested resource with the second device over the wireless network in response to the determination that the request is authorized.

\* \* \* \* \*